June 25, 1935.  A. J. SCHOLTES  2,006,330
COASTING SLED
Filed Feb. 21, 1935    3 Sheets-Sheet 1
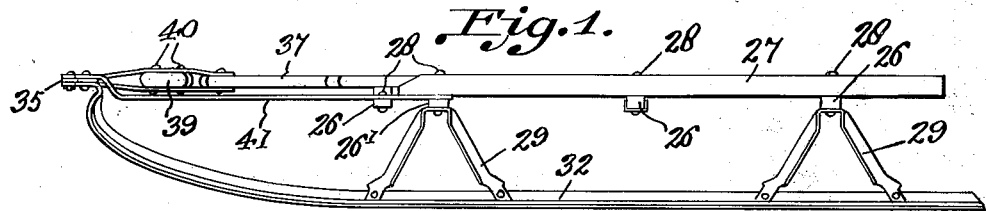
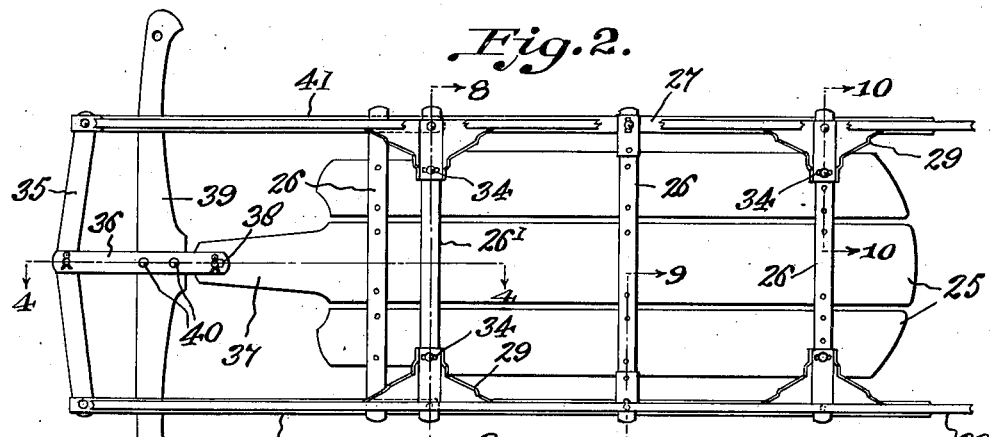
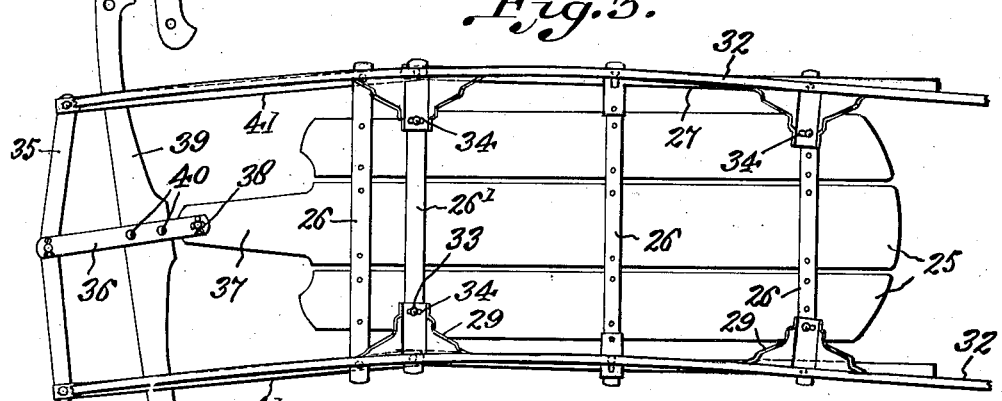
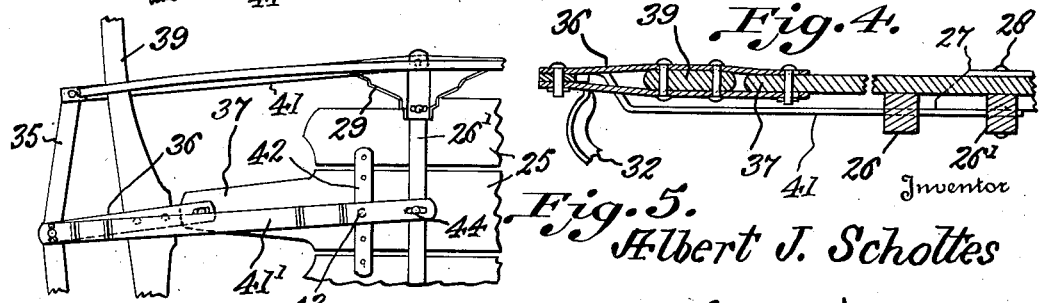
Inventor
Albert J. Scholtes
By Mawhinney & Mawhinney
Attorneys June 25, 1935.　　A. J. SCHOLTES　　2,006,330
COASTING SLED
Filed Feb. 21, 1935　　3 Sheets-Sheet 2
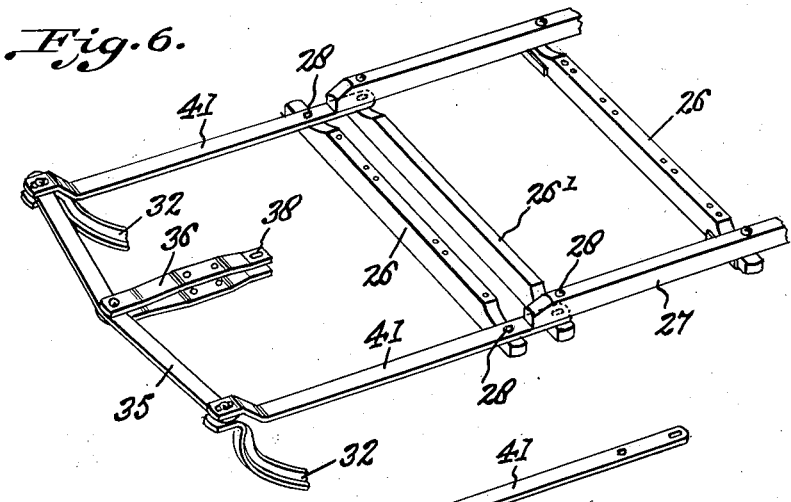
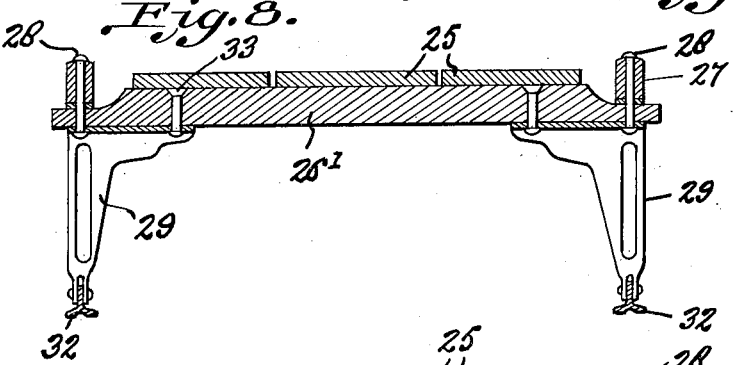
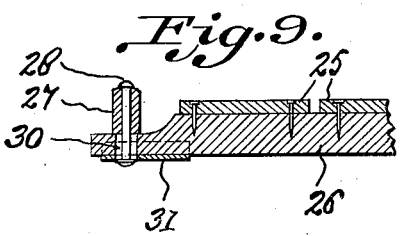
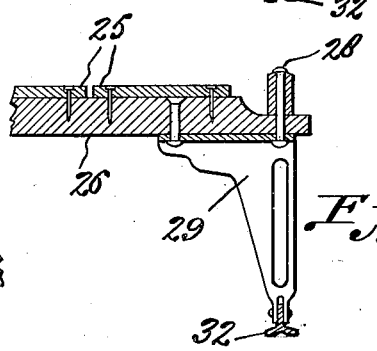
Inventor
Albert J. Scholtes
By Mawhinney & Mawhinney
Attorneys

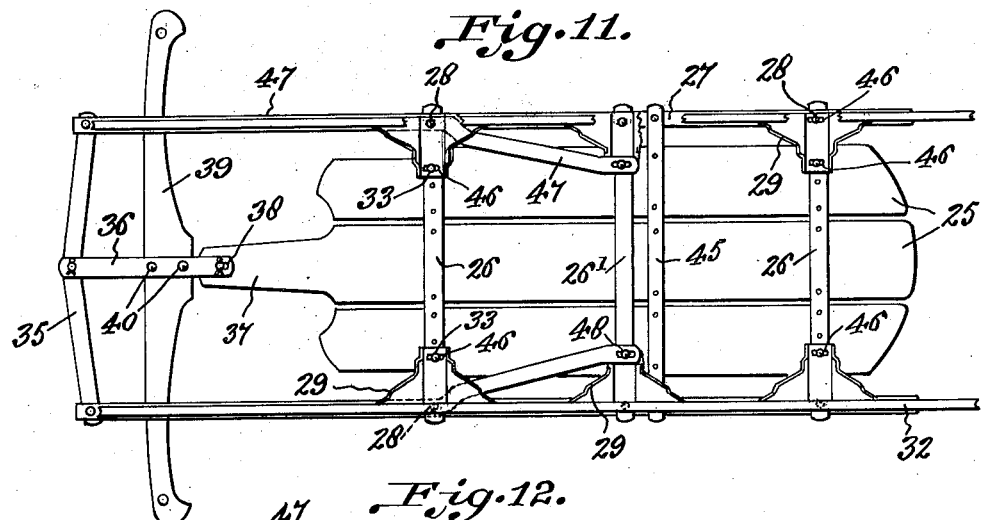
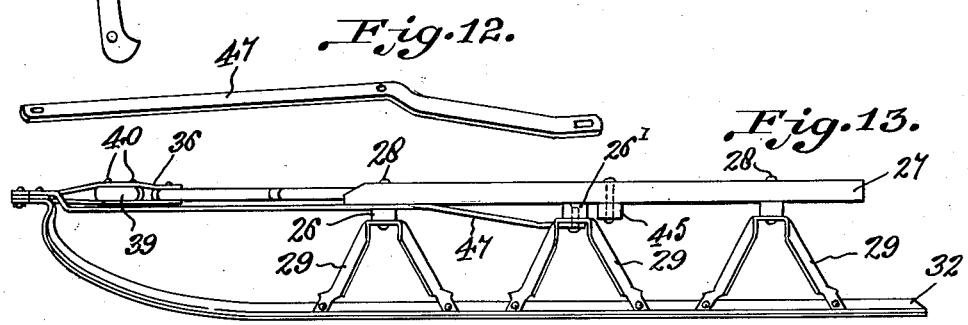
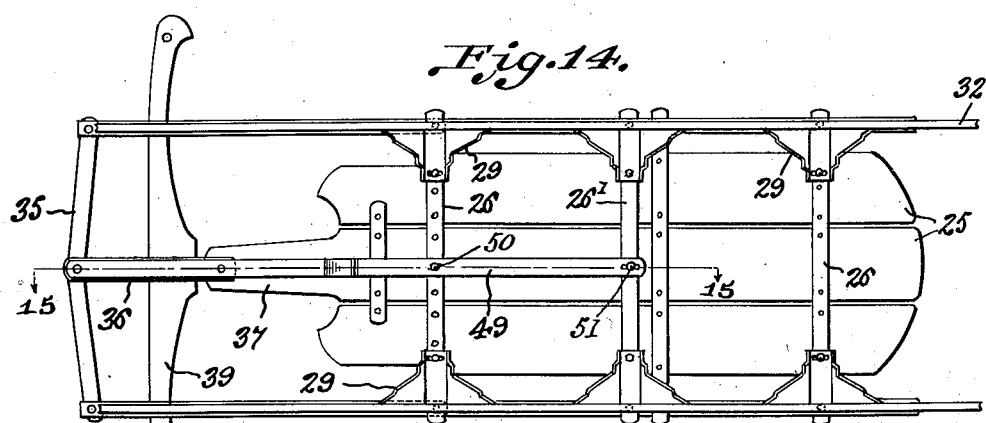
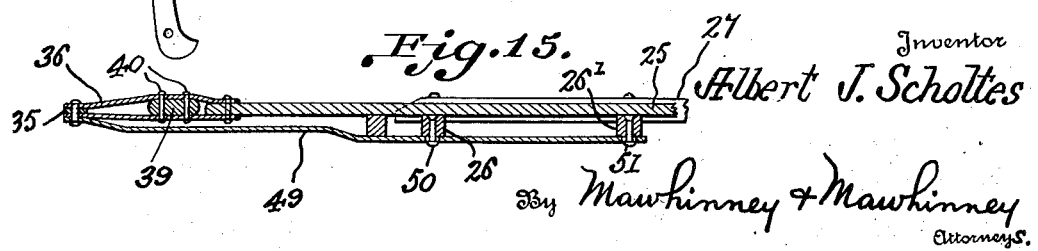

Patented June 25, 1935

2,006,330

UNITED STATES PATENT OFFICE 2,006,330

COASTING SLED

Albert J. Scholtes, Baltimore, Md.

Application February 21, 1935, Serial No. 7,615

15 Claims. (Cl. 280—22)

The present invention relates to coasting sleds, and more particularly to sleds of the flexible runner type.

An object of the present invention is to provide certain improvements in the invention set forth in my copending application Serial No. 731,504, filed June 20, 1934 for more economically carrying out the objects of said prior invention.

Another object is to eliminate certain heretofore used parts and to make use of certain of the usual sled parts to accomplish the novel results.

A further object of the invention is to provide a construction which carries out the novel features and which is adaptable to sleds of both the two and the three bracket type.

Another object of the invention is to provide a novel combined structure in a coasting sled for producing a sled structure which is of relatively few parts, wherein the parts admit of strength in their construction and interconnection, wherein the sled is comparatively light in weight and economical to manufacture, and a sled which readily responds to slight control adjustments.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of one type of sled having two brackets and the improvements of this invention applied thereto.

Figure 2 is a bottom plan view of the same, the runners being in normal straight line position.

Figure 3 is a similar view showing a curved adjustment of the runners to change the course of travel of the sled.

Figure 4 is a fragmentary longitudinal section on the line 4—4 of Figure 2 through the central front end of the sled.

Figure 5 is a fragmentary bottom plan view of a modified form of the sled.

Figure 6 is a fragmentary perspective skeleton view of the novel parts of the sled shown in Figures 1 to 4.

Figure 7 is a detail perspective view of one of the levers used in Figure 6.

Figure 8 is an enlarged transverse section taken through the sled on the line 8—8 of Figure 2.

Figure 9 is a fragmentary transverse section taken through one side of the sled on the line 9—9 of Figure 2.

Figure 10 is a similar view taken on the line 10—10 of Figure 2.

Figure 11 is a bottom plan view of a three bracket sled having another modified form of the invention applied thereto.

Figure 12 is a detail perspective view of one of the levers employed in the structure of Figure 11.

Figure 13 is a side elevation of the modified form shown in Figure 11.

Figure 14 is a bottom plan view of a further modified form of sled.

Figure 15 is a fragmentary longitudinal section taken through the front end thereof on the line 15—15 of Figure 14.

Referring now to the drawings and first to the form of the invention shown in Figures 1 to 4 and 6 to 10, the body portion of the sled is provided with a platform 25 which may be of the usual slat construction and which is provided across its under side with a plurality of spaced cross bars 26 secured by screws, nails or the like to the slats of the platform. The cross pieces 26 extend at opposite ends beyond the platform 25 to provide raves or side rails 27 which serve as hand holds for the sled. These side rails are secured to the end portions of the cross pieces 26 by rivets 28 or the like, and where the sled is provided at each side with two brackets 29, the intermediate cross bar 26 is provided, as shown in Figure 9, at each end with a slot 30 transverse to the sled body and through which the adjacent rivet 28 passes so that the side rail 27 may have freedom to shift on member 26 either inwardly or outwardly at the side of the sled when the cross member 26' of the sled is shifted to either side. A wear plate 31 is preferably disposed against the lower face of the cross bar 26 to take up wear of the rivet head against the under side of the cross piece incident to the shifting of the side rail 27.

The brackets 29 are disposed in transverse pairs and are secured at their upper ends to the adjacent cross bars 26 and 26' and at their lower ends are secured to runners 32. As shown to advantage in Figures 1, 2 and 8, the forward brackets 29 are pivotally mounted at their outer portions on the adjacent rivets 28 against the under side of the cross piece 26' while their inner portions are slidably held against the cross piece 26' by rivets 33 which extend through slots 34 provided in the inner portions of the brackets 29 so that the brackets are free to turn upon the rivets 28 to admit flexing of the runners 32 beneath the sled body. The rear brackets 29, as shown particularly in Figures 2 and 10, are similarly mounted and are free to pivot about their adjacent rivets 28.

The runners 32 extend forwardly and are curved upwardly toward the plane of the platform 25 at their forward ends and are connected thereat by a cross bar 35 which may be in one piece and which at its intermediate portion is pivoted to the forward end of an operating lever or link 36 which may comprise a pair of straps as shown which extend rearwardly from the front bar 35 and are pivotally connected to a central extension 37 of the platform 25, the connection preferably including a longitudinal slot 38 in the rear end of the operating lever 36.

A handle 39 extends across the forward portion of the sled and is rigidly connected to the operating lever or link 36 by rivets 40 or the like so that the swinging of the handle or handle bar 39 causes the operating lever 36 to swing upon the platform extension 37 and shift the front bar 35 in the desired direction. The runners 32 are pivotally connected at their forward ends to the opposite ends of the front bar 35. The cross bar or piece 26' is slidably disposed beneath the platform 25 rearwardly of the front cross piece 26 and is also located between the intermediate portions of the runners 32 so that when the cross bar 26' is shifted transversely beneath the platform the intermediate portions of the runners 32 are correspondingly flexed.

The sled is provided at its forward end with a pair of levers or arms 41 pivotally connected at their forward ends to the outer ends of the front bar 35 and the forward ends of the runners 32. The levers 41 extend rearwardly at the sides of the sled and across the opposite ends of the front cross bar 26 and are pivotally connected thereto by the forward rivets 28 of the sled body. The rear ends of the arms or levers 41 extend beyond the cross piece 26 and engage the opposite ends of the shiftable cross bar 26', being pivotally connected thereto by the adjacent rivets 28 so that these rivets 28 interconnect the forward ends of the side rails 27, the rear ends of the arms 41 and the opposite ends of the cross bar 26'.

The rear ends of the arms 41 are provided with elongated openings or slots for the rivets 28 to take up differences in length between the connections of the various parts when the levers or arms 41 are swung upon their pivots 28. As the front cross bar 26 is secured to the platform 25, swinging of the arms 41 causes the shiftable cross bar 26' to slide transversely beneath the platform and thus flex the runners 32 therewith. The levers or arms 41 also serve as braces for the forward ends of the runners 32 so as to reinforce the sled body and hold the parts firmly in their various positions and for the various adjustments required in the steering of the sled.

As a modification of this structure the sled, as shown in Figure 5, may be provided with a single lever or arm 41' which is disposed between the side portions of the sled body and is pivotally connected to the front bar 35 at its intermediate portion and extends rearwardly to a short cross piece 42 which takes the place of the front cross piece 26 and is secured to the platform 25 of the sled body. A pivot 43 connects the arm 41' to the fixed cross piece 42 while the arm 41' extends rearwardly and is connected by a single pivot 44 to the sliding cross piece 26' of the sled. Thus, the arm 41' is swung at its forward end on the pivot of the operating lever or link 36 and has the same effect on the sliding cross piece 26' as does the pair of levers 41. Of course the levers 41 are not intermediately pivoted in this modification but provide pivoted braces at opposite sides of the sled in the plane of its platform 25.

With reference now to Figures 11, 12 and 13, the sled is shown as of the three bracket type and wherein forward and rear fixed cross bars 26 are provided with their brackets 29 as above described. The platform 25 may be provided with an intermediate fixed cross bar 45 used merely for the purpose of reinforcing the platform and holding the side rails 27 thereto. The slidable cross bar 26' is disposed forwardly of the fixed cross bar 45 and carries the intermediate runner brackets 29 as above described with the exception that both of the rear brackets 29 are provided at their outer and inner portions with slots 46 through which the adjacent rivets 28 pass to admit of the pivotal and longitudinal adjustment of the brackets and their runners 32 beneath the sled body. The intermediate brackets 29 are fixed on their slidable cross bar 26' while the forward brackets 29 are connected at their outer portions to their fixed cross bar 26 by pivoting on the rivets 28 and at their inner portions to the cross bar 26 by the rivets 33 and the slots 46, similar to this showing in Figure 8. At the forward end of the sled, there is provided at opposite sides a pair of levers or arms 47, similar to the arms or levers 41, and which are connected at their forward ends to the opposite ends of the front bar 35 and forward ends of the runners 32 and at their intermediate portions are pivotally mounted upon the rivets 28 of the forward fixed cross bar 26. The rear ends of the levers or arms 47 are offset inwardly and are bent downwardly sufficiently to dispose the rear ends of the levers 47 against the lower side of the shiftable cross bar 26' and are connected thereto by rivets 48 which pass through slots in the rear ends of the levers 47, through the round holes in the inner portions of the adjacent brackets 29 and into the cross piece 26'.

When the levers 47 are swung in one direction at their forward ends, the rear ends of the levers 47 shift the cross bar 26' transversely in an opposite direction and, through their adjacent brackets 29, flex the intermediate portions of the runners 32 in a direction opposite from the displacement of the forward ends of the runners. Thus, in this type of sled the swinging of the handle bar 39 pivots the operating lever 46 and shifts the front bar 35 in one direction, flexing the runners in that direction. At the same time the arms 37 are swung upon their pivots 28 and shift the bar 26' as above described. The runners 32 are thus flexed uniformly and equally throughout their lengths.

In Figures 14 and 15, a modification of this structure is shown and wherein a lever or arm 49 is pivotally mounted at its forward end to the central portion of the front bar 35 and is carried rearwardly to the first cross bar 26 and is pivoted thereon at 50. The rear end of the arm 49 extends to the shiftable cross bar 26' and is pivotally connected to the intermediate portion thereof by a pivot 51 so that the intermediate brackets 29 of the sled are shifted by a single lever 49 when the forward ends of the runners are flexed and consequently the intermediate portions of the runners are flexed in the opposite direction. This provides for a substantially continuous curving of the runners from end to end.

It is obvious that various changes and modifications may be made in the details of construction and design of the above specifically described embodiment of this invention without departing from the spirit thereof, such changes and modifications being restricted only by the scope of the following claims.

What is claimed is:—

1. A coasting sled, comprising a body, a pair of runners for the body, movable connections between the body and the runners to support the body on the runners, means connecting the forward portions of the runners, a cross bar connected across the runners rearwardly of said connecting means, levers pivoted to the opposite side portions of the body and pivotally connected to the said connecting means and the cross bar for moving the same and flexing the adjacent portions of the runners in opposite directions and means acting through said connecting means for operating the levers.

2. A coasting sled, comprising a body portion having a pair of flexible runners connected thereto, means interconnecting the forward ends of the runners, a cross bar interconnecting the intermediate portions of the runners, means for swinging the runner connecting means transversely of the sled body to flex the forward ends of the runners, and lever means between the runner connecting means and said cross bar and connected to the sled body for shifting the cross bar in a direction opposite to the movement of the runner connecting means.

3. A coasting sled, comprising a body portion having flexible runners, a front bar connected across the forward ends of the runners, a second bar connected across the intermediate portions of the runners, lever means pivoted to the sled body and to said bars for causing the same to move in opposite directions, and guide means carried by the sled body and connected to the front bar for shifting the same.

4. A coasting sled, comprising a sled body having a platform and flexible runners movably mounted beneath the platform, said platform having a forward intermediate extension, a front bar connected across the forward ends of the runners, an operating lever pivotally mounted upon said forward extension of the platform and pivotally connected to the front bar, a handle bar secured to the operating lever for swinging the same and shifting the front bar with the forward ends of the runners, a pair of side levers pivotally mounted on the sled body and having their forward ends pivotally connected to the opposite ends of the front bar, an intermediate slidable cross bar secured across the runners intermediate their ends, and connections between the slidable cross bar and the rear ends of said levers for shifting the cross bar and the intermediate portions of the runners in a direction opposite to the shifting of the front bar.

5. A coasting sled, comprising a sled body having flexible runners movably mounted thereon, a front bar connected across the forward ends of the runners, a handle bar pivotally connected to the sled body and the front bar for shifting the latter transversely of the sled body, an intermediate sliding bar connected across the intermediate portions of the runners, a pair of side levers pivotally mounted upon the opposite side portions of the sled body and having their forward ends pivoted to the ends of the front bar and having their rear ends offset inwardly and connected to said intermediate cross bar for shifting the latter in a direction opposite to the movement of the front bar.

6. A coasting sled comprising a platform having spaced cross bars fixed thereto, a slidable cross bar disposed intermediately across the platform, brackets mounted on the opposite ends of said cross bar, runners carried by said brackets, a front bar secured across the forward ends of the runners, a pair of levers pivotally mounted at their intermediate portions upon the ends of the forward fixed cross bar, said levers having their forward ends pivotally connected to the ends of the front bar and having their rear ends offset inwardly and connected to said shiftable cross bar, an operating lever connected between the front bar and said sled body and having a transversely disposed handle bar rigid therewith for swinging the operating lever to shift the front bar.

7. In a coasting sled, a body, a runner movably connected to the body, a forward cross bar connected at one end to the runner, a second cross bar spaced rearwardly from the first cross bar and connected at one end to the adjacent portion of the runner, a lever pivotally mounted on the body, a pivot on the second cross bar directly engaging the rear end of the lever, a second pivot on the forward cross bar directly engaging the forward end of the lever, and means for swinging the lever and moving the cross bars to flex the adjacent portions of the runner in opposite directions.

8. A coasting sled, comprising a body, a pair of runners movably connected to the body for supporting the same, a front cross bar connected to the forward portions of the runners, a second cross bar spaced rearwardly from the front cross bar and connected to the adjacent portions of the runners, levers pivotally mounted on the opposite side portions of the body and connected at opposite ends to the said cross bars, a shifting lever pivoted between the body and the front cross bar, and a handle secured across the shifting lever for swinging the same to shift the front cross bar in one direction and swing the said first levers to shift the second cross bar in an opposite direction and correspondingly flex the runners at spaced points in opposite directions.

9. In a coasting sled, a body, a runner movably mounted on the body, a forward cross bar connected at one end to the front end of the runner, a second cross bar spaced rearwardly from the forward cross bar and connected at one end to the adjacent portion of the runner, a lever pivotally mounted on the body and pivotally connected at opposite ends directly to the cross bars, a shifting lever pivotally mounted between the body and a cross bar, and a handle carried by the shifting lever for swinging the same to move the cross bars and flex the adjacent portions of the runner in opposite directions.

10. In a coasting sled, a platform, runners having brackets, cross bars disposed across the bottom of the platform with a cross bar fixed to the platform and a cross bar slidable therebeneath and certain cross bars interconnecting the runner brackets, side rails mounted on the end portions of the cross bars along the sides of the body, a fixed cross bar having slots in its end portions extending transversely of the body, and pivots carried in the adjacent portions of the side rails and engaging through said slots for connecting the side rails to the fixed cross bar and admit the relative transverse movements of the same.

11. A coasting sled comprising a platform having a runner therebeneath, a forward cross bar connected at one end to the runner, a second cross bar disposed beneath the platform and connected at one end to the intermediate portion of the runner, an operating lever pivotally mounted on the platform and connected to said front cross bar to swing the latter transversely of the body, a lever pivotally mounted on the front cross bar at its middle portion, a fixed cross piece carried by the platform and pivotally supporting the intermediate portion of the lever, said lever extending rearwardly from its pivotal support to said second cross bar for shifting the latter and the intermediate portion of the runner in one direction when the front cross bar is shifted in an opposite direction.

12. A coasting sled comprising a platform, a plurality of fixed cross bars secured to the bottom of the platform, a shiftable cross bar disposed across the intermediate portion of the platform, brackets mounted on the opposite ends of said cross bars, a front bar interconnecting the forward ends of the runners, operating means carried by the platform and connected to the front cross bar for shifting the same transversely of the sled body, and a centrally disposed lever pivotally connected at its forward end to said front cross bar and pivotally mounted at its intermediate portion to a forward fixed cross bar, the rear end of said lever extending to the shiftable cross bar and pivotally connected to the intermediate portion thereof for shifting the intermediate cross bar in an opposite direction to the movement of the front cross bar.

13. A coasting sled, comprising a sled body having flexible runners movably mounted thereon, a front bar connected across the forward ends of the runners, a handle bar pivotally connected to the sled body and the front bar for shifting the latter transversely of the sled body, an intermediate sliding bar connected across the intermediate portions of the runners, a pair of side levers pivotally mounted upon the opposite side portions of the sled body and having their forward ends pivoted to the ends of the front bar and having their rear ends connected to said intermediate cross bar for shifting the latter in a direction opposite to the movement of the front bar.

14. A coasting sled, comprising a platform having spaced cross bars fixed thereto, a slidable cross bar disposed intermediately across the platform, brackets mounted on the opposite ends of said cross bar, runners carried by said brackets, a front bar secured across the forward ends of the runners, a pair of levers pivotally mounted at their intermediate portions upon the ends of the forward fixed cross bar, said levers having their forward ends pivotally connected to the ends of the front bar and having their rear ends connected to said shiftable cross bar, an operating lever connected between the front bar and said sled body and having a transversely disposed handle bar rigid therewith for swinging the operating lever to shift the front bar.

15. A coasting sled comprising a platform having spaced cross bars fixed thereto, a slidable cross bar disposed intermediately across the platform, brackets mounted on the opposite ends of said cross bar, runners carried by said brackets, a front bar secured across the forward ends of the runners, a pair of levers pivotally mounted at their intermediate portions upon the body portion, said levers having their forward ends pivotally connected to the ends of the front bar and having their rear ends connected to said shiftable cross bar, an operating lever connected between the front bar and said sled body and having a transversely disposed handle bar rigid therewith for swinging the operating lever to shift the front bar.

ALBERT J. SCHOLTES.